United States Patent
Levy (10) Patent No.: US 6,556,997 B1
(45) Date of Patent: Apr. 29, 2003

(54) INFORMATION RETRIEVAL SYSTEM

(75) Inventor: Meny Levy, Tel Aviv (IL)

(73) Assignee: Comverse Ltd., Tel Aviv (IL)

( * ) Notice: Subject to any disclaimer, the term of this patent is extended or adjusted under 35 U.S.C. 154(b) by 0 days.

(21) Appl. No.: 09/476,795

(22) Filed: Dec. 30, 1999

Related U.S. Application Data (60) Provisional application No. 60/158,118, filed on Oct. 7, 1999.

(51) Int. Cl.[7] ............................................. G06F 17/30
(52) U.S. Cl. ...................................................... 707/10
(58) Field of Search ................................ 707/517, 102, 707/101, 103, 104, 10

(56) References Cited

U.S. PATENT DOCUMENTS

| | | | |
|---|---|---|---|
| 6,078,924 A | * | 6/2000 | Ainsbury |
| 6,157,924 A | * | 12/2000 | Austin |
| 6,175,830 B1 | * | 1/2001 | Maynard |
| 6,199,077 B1 | * | 3/2001 | Inala |
| 6,412,073 B1 | * | 6/2002 | Rangan ........................ 705/14 |
| 2001/0042083 A1 | * | 11/2001 | Saito et al. |

* cited by examiner

*Primary Examiner*—Safet Metjahic
*Assistant Examiner*—Haythim J. Alaubaidi
(74) *Attorney, Agent, or Firm*—Sughrue Mion, PLLC (57) ABSTRACT

A method and device for easily defining new information services for delivery to customers. The information to be delivered is extracted from information sources such as standard Internet web pages, databases, text files or proprietary data sources. The customer is provided with a list of accessible services, and may choose from among the services and may also specify delivery schedules of the information service. Information may be delivered to a cellular telephone display, or sent to a fax machine, beeper or to an e-mail server. The user may create a rule, composed of condition on the data in the page which has to met—for example a known text that has to be located in a known table cell and an action—for example to search for the next table in the page that meets the specified condition. This rule is maintained as part of the extraction template.

24 Claims, 8 Drawing Sheets

When would you like the message to be sent?

- ● Every day at [10:00 ◁▷]
- ○ Every week on [Monday ▷] at [10:00 ◁▷]
- ○ Every [6 ◁▷] hours [▷] starting at [10:00 ◁▷]
- ○ When [value ▷] changes [ ]

In any case, send only

Between [06:00 ◁▷] and [22:00 ◁▷]

And only on these days of the week:

☑ Sunday ☑ Monday ☑ Tuesday ☑ Wednesday ☑ Thursday
☐ Friday ☐ Saturday

[Save profile]  [Reset form]  [Back to profiles list]

INFORMATION RETRIEVAL SYSTEM

This application claims the benefit of Provisional Application No. 60/158,118 filed Oct. 7, 1999.

FIELD OF THE INVENTION

The present invention relates generally to information services, and more particularly, to a computer-controlled process for automatically extracting information from information sources for delivery over a communications medium, using a simplified process of adding new information services for selection by information service clients.

BACKGROUND OF THE INVENTION

The information age has arrived, with nearly limitless amounts of information being stored digitally. In particualr, the Internet has become a tremendous information resource, allowing every user the ability to obtain, at little or no cost, current information on a whole host of subjects. The Internet has evolved into a relatively standard method of presentation of text information, utilizing Hyper Text Markup Language (HTML) or Extensible Markup Language (XML) to display the text. This standardization has allowed for the explosive growth of the Internet around the world, with new information resources being added continuously. Proprietary data bases, information sources and corporate databases have added to the information explosion.

Cellular telephone technology has greatly advanced, and the consequent cost for ownership and usage of cellular telephones has declined. The delivery of a voice telephone call to a subscriber has however become somewhat of a commodity, with the resultant decrease in profitability for the cellular telephone operator companies. As cellular technology has continued to advance, many cellular phones have been equipped with the ability to send and receive short text messages, popularly known as Short Message Services (SMS). Other technologies for delivering information including but not limited to the Wireless Application Protocol (WAP) have also been developed. This ability enables the cellular operator to distinguish itself by the message services offered, with the additional benefit of added revenue for the delivery of these text services. Many cellular telephony vendors offer a broad range of short message services, including message delivery and scheduled and on-demand information delivery—such as stock quotes and weather forecasts. Using cellular telephones many users can dial up a service center, and by choosing the appropriate option, have a current stock quote displayed on their telephone display.

While there is a current focus on cellular technology, the need for information delivery is by no means restricted to cellular telephone customers. Information is currently delivered by alpha numeric pagers, e-mail, voice mail etc.

These advanced information services have typically been supplied by content providers, with such well known names as Reuters, and CNN. However, these content providers have historically each delivered their information in their own proprietary format, which must then be converted to the cellular operators format for delivery to the SMS or other delivery system. This is an expensive and time consuming task, requiring careful coordination and programming between the content provider and cellular telephony vendors technicians and programmers. Adding new services becomes quite burdensome and technically daunting.

Recently GSM Information Network B.V. of the Netherlands, WWW.GIN.NL, have developed a system that allows a cellular phone customer to define information to be delivered to them. This is typically accomplished by accessing the GIN web site over the Internet, and first providing the customer's cellular telephone number and a password. Once the system has been accessed, the customer may define a specific web page from the Internet, which is to be accessed. A search string may also be defined, as well as delivery options, such as scheduled delivery or delivery on request.

When delivery is to occur, the GIN system will access the web page over the Internet, and using the pre-defined search string, the desired content is found and sent to the customer's cellular telephone via the operator's SMS system. A maximum of 150 characters may be sent, or until a line break is found. This system gives the cellular customer the ability to access a pre-defined web location, however the exact location and an appropriate search string must be defined by the customer. The system does not give the cellular operator a simple tool to define new services that may be accessed by all customers. It does also not solve the problem of the giving the cellular operator access to Internet-supplied information for delivery to those customers, and is limited to Internet based information sources.

Thus, existing information retrieval systems are not user-friendly, and extracting specific web page elements requires knowledge of Internet protocols and web page formats. Extracting information from proprietary sources such as corporate databases, or information networks such as Reuters requires detailed protocol knowledge.

Therefore it would be desirable to provide an apparatus and method to define in a simple and user-friendly manner new information services which may be accessed for delivery over a communication medium, for delivery to a user such as by a display on a cellular telephone, with the information for these services being supplied from a wide range of sources including from standard Internet web pages, corporate Intranets, corporate databases, text files and external proprietary information sources such as Reuters.

SUMMARY OF THE INVENTION

Accordingly, it is a principal object of the present invention to simplify the addition of new information services, and to provide a user-friendly means for easily developing new information services whose content will be derived by accessing pre-defined web pages or other sources of information such as corporate databases, text files, or external proprietary sources.

In accordance with a preferred embodiment of the present invention, there is provided a method for defining at least one new information service for delivery to at least one customer via a communication medium, said method comprising:

accessing a source of information;

parsing said information source into at least one extractable element;

creating an extraction template;

selecting said at least one extractable element to be added to said extraction template, and adding said extraction template to a list of deliverable information services.

In a preferred embodiment, the inventive method enables an operator of cellular information services to easily define new information services that may be delivered to customers. Information for these services is extracted from standard web pages found on the Internet and other sources of information such as databases, intranet pages, text files and external proprietary information sources. The cellular operator uses a parsing tool to locate extractable elements from the desired source of information, and the operator attaches labels to desired extractable elements. The information service is then labeled and added to the list of available information services, with the labels and the address of the information source being used to allow the cellular operator to retrieve and deliver the information.

The present invention is applicable to other transmission technologies, delivery protocols, receiving devices, interconnection technologies, and information sources. In accordance with the inventive method, a user can simply and easily define and extract information elements from a data source to be sent to information service clients.

Other features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding elements or sections throughout, and in which.

DETAILED DESCRIPTION OF THE PREFERRED EMBODIMENTS

Figure 1:
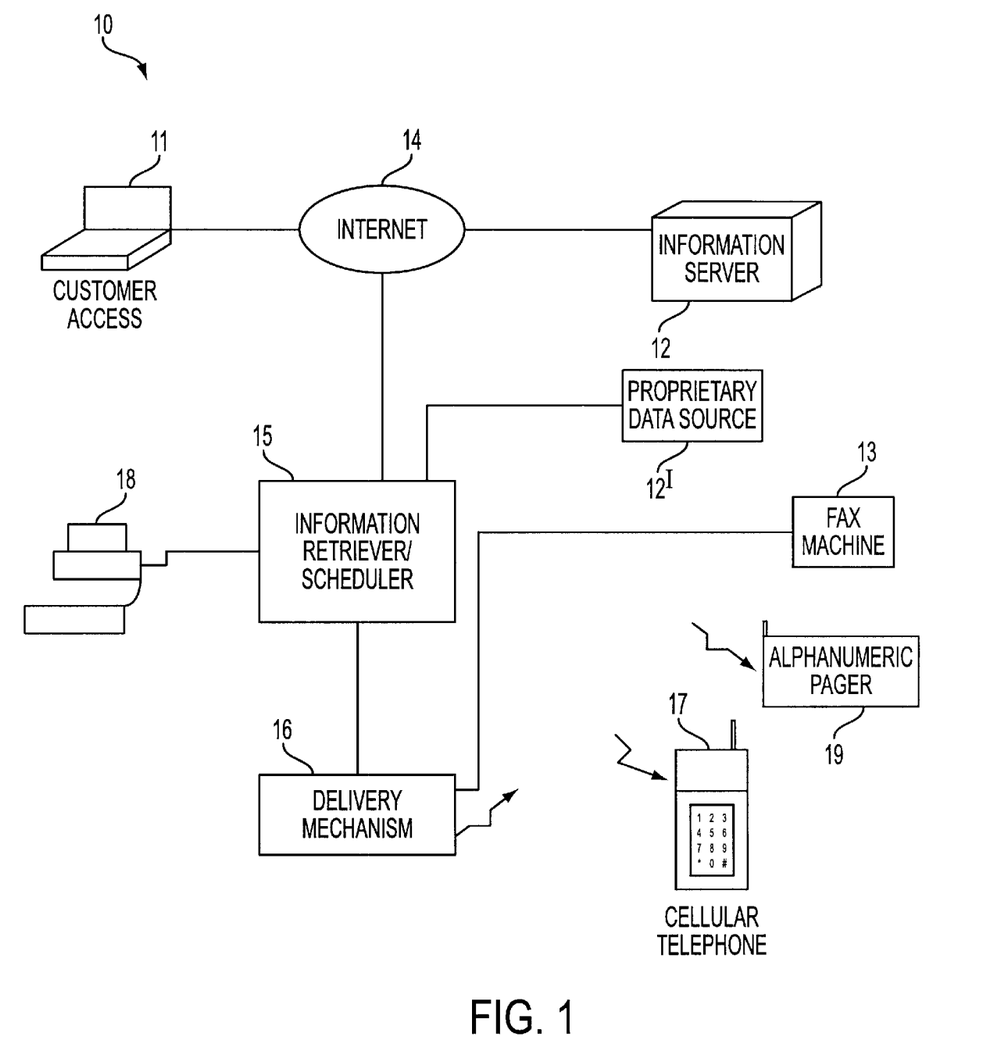
FIG. 1 illustrates a block diagram of a system for delivering information which is extracted from an information source for delivery to customers.

Referring now to FIG. 1 there is shown a schematic block diagram of a preferred embodiment of a complete information retrieval system 10 in which the present invention may be implemented, containing both hardware and software needed to enable the simple addition of new cellular information services, with the information source being standard Internet pages. Accessible information sources are not limited to the Internet, but may include also corporate databases, external databases not accessible via the Internet, and others, all as discussed below. The use of the Internet for providing access to an information source is for illustration only, and is not intended to be limitative.

As used herein, the terms "cellular operator" and "operator" are interchangeable, and refer to the operator of the cellular telephone system. The term "customer" refers to the information services client, who can receive information via his cellular telephone. The term "user" refers to the individual using the system 10, whether it be the operator or customer, to define the system operation and select available options.

System 10 comprises a computer 11 for use as a customer interface and the Internet 14 for providing access between parts of the system which are not directly connected. System 10 also comprises information retriever/scheduler unit 15 which schedules and retrieves the desired information, delivery mechanism 16 which delivers the retrieved information to the customer, cellular telephone 17 which contains a display for displaying the desired information, and information server 12 which contains the web pages which contain the desired information. System 10 also comprises a proprietary data source 12A (which may be an internal corporate database or an external database not accessible via the Internet), a fax machine 13 connected over a telephone line for receiving information, and alphanumeric pager 19 for receiving information.

While the invention will be explained in detail for a system that delivers information retrieved from web pages to displays on cellular phones as text via a Short Message System (SMS), it is to be understood, by reference to the conceptual framework shown in FIG. 2, that the invention is applicable to other transmission technologies, delivery protocols, receiving devices, interconnection technologies, and information sources. These include all cellular phone technologies, including but not limited to GSM, TDMA, CDMA, AMPS, DAMPS, protocols such as SMA and WAP, paging protocols, wireless telephones such as personal communication systems (PCS) and ultimate receiving units such as celluar telephones, alpha numeric pagers, computers, telephones and fax machines. Information may be supplied by databases, intranets, text files, or proprietary information sources. The customer may request information by cellular technology, telephone IVR system, or over an Intranet instead of over the Internet all within the scope of the invention.

Figure 2:
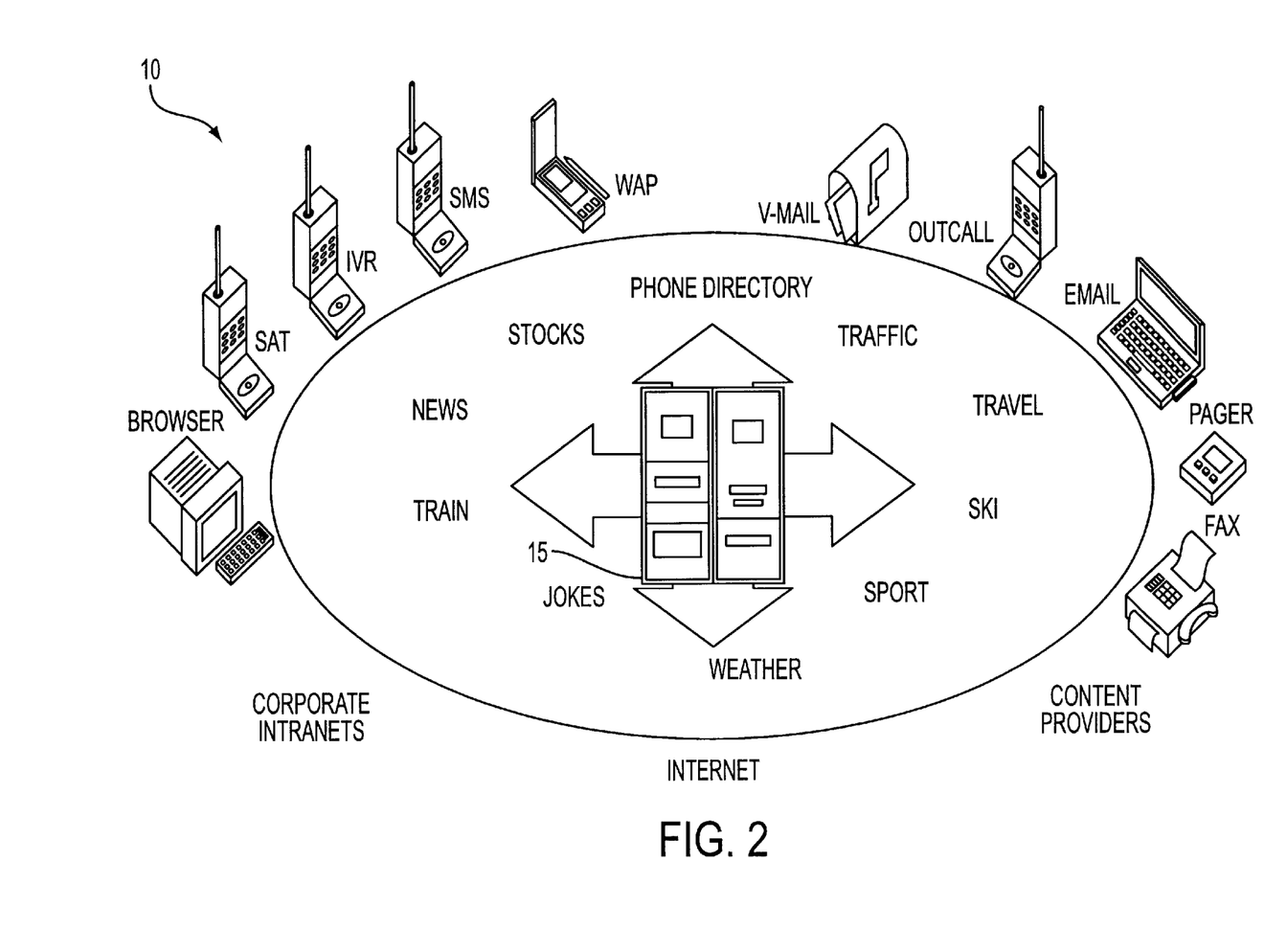
FIG. 2 illustrates a conceptual framework in which the invention is applicable.

Examples of the types of information requested and/or available, as shown in FIG. 2, include stock price information, news, train schedule information, etc. and these are shown only for illustration, as it will be appreciated that a limitless variation of information types is possible. The system 10 provides an information "switch", taking information from any source and transferring it via any channel, providing a mobile portal having seamless access with all interfaces.

The customer typically accesses the system 10 via computer 11 which is connected to the Internet 14. The customer uses a standard web browser and addresses the browser to access the information retriever/scheduler unit 15. The information retriever/scheduler unit 15 is pre-programmed by the cellular operator through operator terminal 18 which may be directly connected as shown, or routed through a network such as the Internet 14. Information retriever/scheduler unit 15 shows the customer a list of authorized information services, which may be chosen for delivery to the customer's cellular telephone or other delivery unit. The source of some or all of the information services will be accessed over the Internet 14 from standard web information servers 12. The customer may also access the system by telephone IVR or from his cellular or mobile telephone without using the Internet 14.

Figure 3:
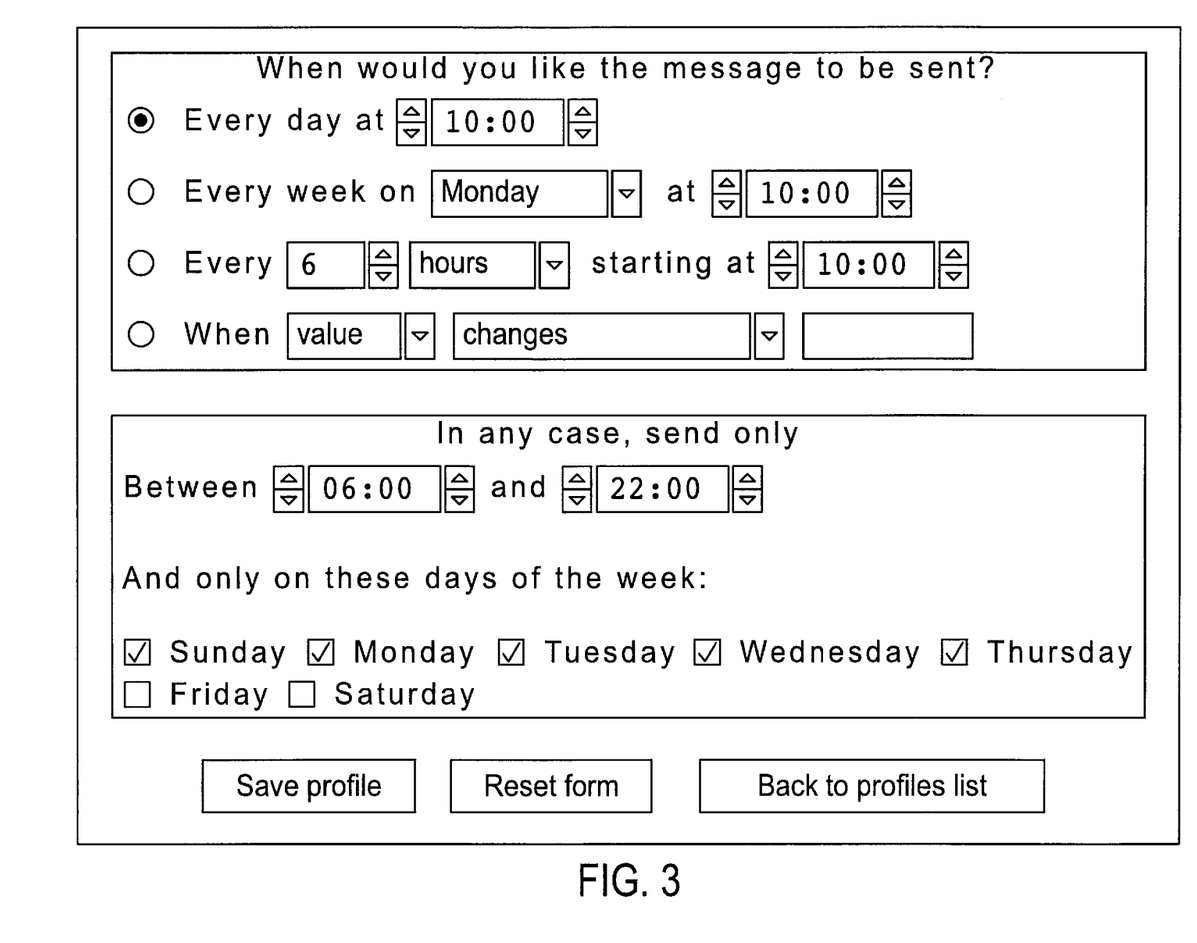
FIG. 3 illustrates an input screen for selecting information delivery scheduling options.

Referring to FIG. 3, there is illustrated an example of an information self-provisioning screen which may be accessed by the customer. The word "provisioning", which is a verb, is herein used as a term of art meaning to do what is required to establish the service, and in particular the selection of desired items of information and their specification as part of the service to be obtained. In addition, the word "re-provisioning" is a term of art which means to make alterations to a pre-existing service. As explained below, the invention includes not only provisioning, but also re-provisioning, which may take place at any time. Throughout this application, the use of the word "provisioning" is not intended to exclude the ability to re-provision service which has already been provisioned.

Each information service can be provisioned by the customer for numerous delivery options, including but not limited to time of day, specific days of the week, or when certain values change. The customer also supplies the delivery destination requested, such as the telephone number of his cellular telephone 17. Once the customer has defined what information he desires to retrieve from the list of authorized services, as well the delivery scheduling and method, the customer may log off computer 11.

When information retriever/scheduler 15 needs to retrieve information, in a manner that will be further described below, it does so by accessing information server 12 over Internet 14, which as has been noted above is not restricted to being an Internet web page accessed over the Internet. Information may also be retrieved from proprietary data source 12'. Once information has been accessed and retrieved, the information is sent to delivery mechanism 16, which packages it for delivery by SMS service over the cellular network for delivery to cellular telephone 17, where it is displayed. As mentioned above, other delivery technologies and protocols may be used, and the receiving unit need not necessarily be limited to a cellular telephone display, and may be for instance a fax machine 13 or an alphanumeric pager 19. Other units and delivery technologies and protocols are also be supported by delivery mechanism 16. In the event that the message can not be delivered, delivery mechanism 16, contains the necessary buffers so as to store and forward the message when cellular telephone 17 is again available.

Figure 4:
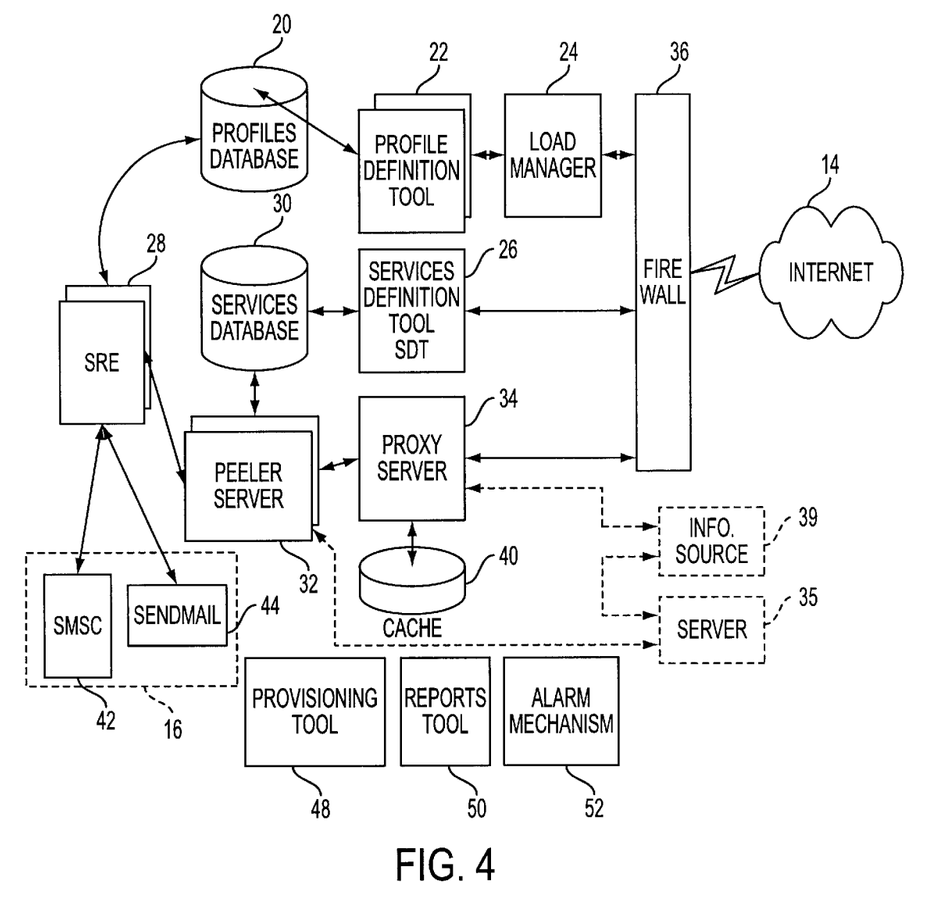
FIG. 4 illustrates a block diagram of a system for adding and accessing new information services.

Referring now to FIG. 4, there is shown a block diagram of the information and retriever/scheduler 15 and delivery mechanism 16 of FIG. 1. Information and retriever/scheduler unit 15 may be implemented in hardware on an Intel Pentium-2 based computer using the UNIX operating system, provided as UnixWare, available from the Santa Cruz Operation, Inc., of Santa Cruz, Calif. It will be understood that the particular hardware implementation is not limited, and using skill of the art design techniques, other hardware may be used for implementation.

Profile database 20 is a database stored on a computer or server, which contains a listing of authorized individual customers and their associated profiles. A customer's profile contains at a minimum the requested method of delivery of information, and the schedule for delivery, as well as a listing of the information services requested by that customer. The list of specific information that may be stored for a customer's profile, including what information is required and what is optional, is called the profile definition list, and is similarly stored in the profile database 20.

The customer may access and update his individual profile, contained in the profile database 20 via the Internet 14 using a standard web browser such as Netscape Navigator available from Netscape Communications Corporation, at www.netscape.com. The unit 15 is protected for security purposes by fire wall 36 as is well known in the art. The customer's access is balanced between multiple copies of web server 22 by load manager 24 so as to maximize the number of individual users that may access the system at once. Web server or profile definition tool 22 contains a program that allows the user to review his current profile, and update the profile with requests for new services. The user may request any and all services which have been put on the system, which is stored in the services database 30. As previously noted, the profile database may be accessed by the customer in a manner other than via a web browser over the Internet. This may include, without intending to be limiting in any way, access by Interactive Voice Response (IVR), WAP, Intranet, or by faxing or calling a request to an operator.

Security in unit 15 is maintained by a standard password system, in a manner well known in those skilled in the art. In this manner, any services that are authorized in the system and that appear in the services database 30, may be requested by the customer by using the password, and placed in the customer's profile database 20. Optionally, different customers may be allowed different information services and different delivery options based on classes of service. These classes will also be defined and stored on the information services list in services database 30.

Delivery options for each service requested may also be updated through server 22, including both manner of delivery, as well as timing of the delivery as previously explained in reference to FIG. 3. This may be programmed to be as little as once a week, or as frequently as hourly, with other possible delivery options easily programmed based on customer requests. Other options for scheduling may include delivery based on events, such as a stock price crossing a certain boundary. Options may be added to the profile definition list from operator terminal 18.

New customers are authorized into the system by operator terminal 18 (in FIG. 1) using provisioning tool 48, which is a software program that allows the operator to access the profile data, and authorize new users into the database. The provisioning tool 48 also allows the operator to define different classes of service of each user, in the event that the operator desires this option.

Services definition tool or SDT 26, whose operation will be detailed below in connection with FIG. 5, operates to define the location, the parameters and the template needed to locate and extract the desired information. Each new service is defined with labels and retrieval information, prior to being stored in the services database 30. Parameters that may be chosen by a customer, such as the stock symbol of company whose quote is to be delivered, are also defined and stored in the services database 30. A unique feature of the services definition tool 26, is its ability to define new services using a browser-like interface, which displays the actual Internet page, from which the information is to be retrieved for the customer. In the event that the information source is not in a compatible mode, either a converter is used, which will convert the source into an HTML or XML compatible source, or, alternatively, a proprietary browser-like tool must be designed for each proprietary or non-compatible source. Services definition tool 26 is controlled by operator terminal 18 which enables the cellular information services operator to add, delete or modify services which may be chosen by a customer.

While the invention is herein described with the operator narrowly defining the available service, and choosing the information source, this is not meant to be limiting in any way. The services definition tool herein described may also be accessed by a customer, who may be allowed to freely define the desired information service. In such an example, once authorization is given for the customer to access an information source, the customer is able to use the services definition tool to define both the specific source to be used from among the authorized sources, as well as the delivery options. This information may then be stored in the profile database 20. Alternatively, a pointer to the storage location for the individual service request may be stored in the profile database 20, with the actual information being stored in the services database 30.

Schedule and retrieval engine (SRE) 28 accesses the profile database 20 on a scheduled basis, as frequently as resources allow, and compares the requested delivery times with the current system time clock. When information is to be delivered to a specific customer, the SRE 28 accesses the peeler server 32, which functions to retrieve the information from the web page containing the requested information from the Internet 14 via the proxy server 34, and fire wall 36. A cache memory 40 is provided for proxy server 34, to reduce the amount of repetitive retrievals required. Peeler server 32, then extracts, or peels, from the retrieved Internet page the information desired by the specific customer, in a manner that will be further detailed below.

In the event that the customer has chosen to receive information when a change in value occurs, the information source is polled on a regular basis and it is examined for changes. The operator will choose the timing to be followed for examination, that is consistent with available resources.

In the event that the information source is not accessed over the Internet 14, the peeler server 32 may be directly connected (via dotted line) to a server 35 that accesses the information, or an information source 39 may be directly connected (via dotted line) to proxy server 34.

This retrieved information is then returned to the SRE 28, which passes it to the delivery mechanism such as short message service center (SMSC) 42 for delivery to the customer. The SMSC 42 is similar in all respects to commercially available units, including the Courier system currently being marketed by the assignee of the present invention. In the event that the customer has chosen e-mail or fax delivery, the information requested, along with the delivery information will instead be delivered to mail sender 44, which will actually send the e-mail or fax message. Other delivery mechanisms, such as a server for alphanumeric pagers (not shown) if desired are also connected to SRE 28 to enable delivery to all potential customers.

The retriever/scheduler unit 15 also contains alarm mechanisms 52, reporting tool 50 and provisioning tool 48 which are used to authorize users, prepare billing based on usage, and maintain the system.

Figure 5:
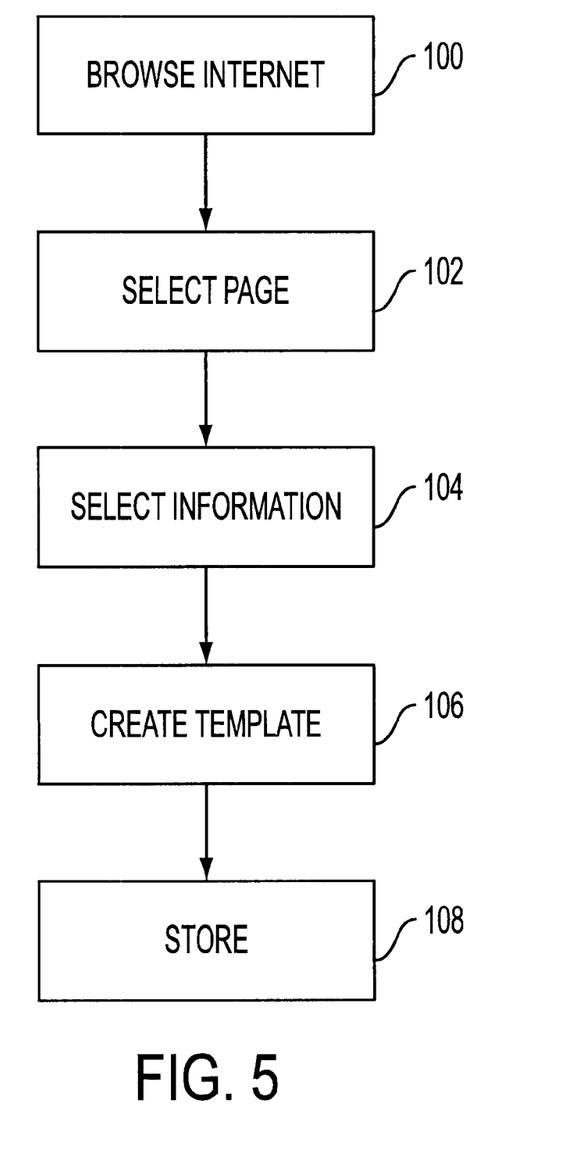
FIG. 5 a high level flow chart of the functional operation of a software tool for defining information services.

Referring now to FIG. 5, there is shown a high level flow chart of the operation of services definition tool 26 which is utilized by the operator to create services which may be accessed by individual users. The operator accesses unit 15 of FIG. 4 via operator terminal 18. In block 100, the services definition tool (SDT) program begins with the operator browsing the Internet to find the page from which he wishes to enable the extraction of information or page elements. The browser is a standard item such as Netscape Navigator, however it is being run in one frame of the display screen (FIG. 6) under control of the SDT program. In block 100, the user browses the Internet or other information source until he finds the exact page on which the information or page element is to be derived. In the case of a web page, the actual location of the web or Internet page being viewed, as indicated by its Uniform Resource Locator (URL), is tracked by the SDT program by sending every event of the browser through the SDT program.

Figure 6:
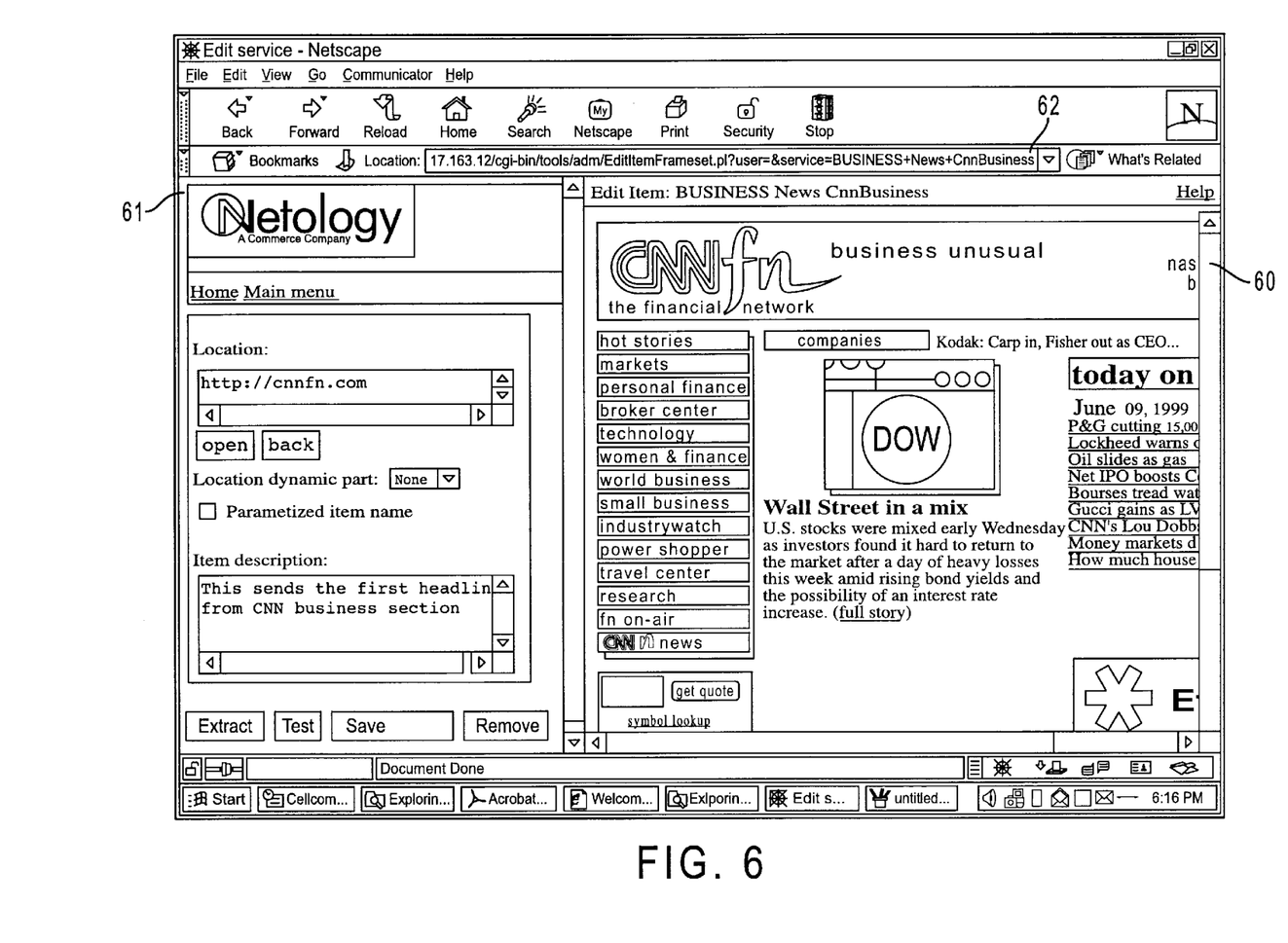
FIG. 6 illustrates the appearance of a display screen used with the software tool of FIG. 5.

Referring now to FIG. 6, there is shown an illustration of the display screen on operator terminal 18 of FIG. 1, during operation of the SDT program. In frame 60 a web browser such as Netscape Navigator is operated, with a standard display. Frame 62 will show the current URL location of the screen being viewed in frame 60. The display is part of a service creation browser arranged as a multiframe screen to simplify the operation and allow the user to view the selections made from the web page, and simultaneously view the extractable elements and the parameters and labels being defined in frame 61, in accordance with the method of the present invention.

Figure 7:
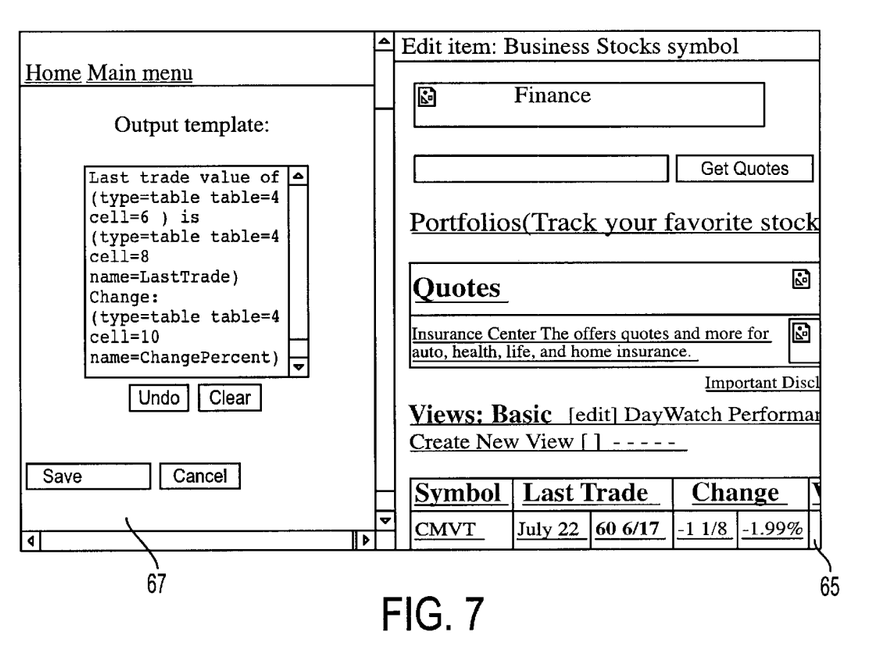
FIG. 7 illustrates a display screen with a parsed web page and output template.

Referring back to FIG. 5, in block 102, the user selects the page being viewed as the source of the desired information, by clicking on a box on the display screen, and this is interpreted by the SDT program, which then parses the viewed Internet web page into extractable elements using a Practical Extraction and Reporting Language (PERL) program available from www.perl.com or other program that contains libraries for fetching and parsing web pages. The SDT program also inserts Javascript activation before each extractable element, which functions as a location script to be utilized in the event that the extractable element is selected. While the location script is here described as being placed before the element, it is to be understood that it may be installed after the element without affecting the results. The display shown in FIG. 6 remains the same, with the web page previously being viewed in frame 60 being replaced with the parsed page containing location scripts. These scripts are not seen by the user in frame 60 of FIG. 6, but are shown in frame 65 on the right-hand side of the FIG. 7 screen, featuring an example of a parsed web page from a financial source of information with stock prices.

In block 106, a template is built indicating the precise location of the extractable element as defined both by the current URL, which was tracked in block 100, and the location script. In addition, a space is provided for descriptive titles or labels which will define for the customer what information is to be retrieved. The service definition title is also inserted, so that the customer may choose the service from the list of service titles in the services database 30. The location script contains information describing the data, so that if the format of the page is changed, the location script can usually still find the requested information. For example, if the data is an element in a table, the column and row number is maintained.

In block 104, the user selects the precise information which is desired. This may be a single extractable element, or a combination of elements, chosen by clicking or highlighting the display screen with a standard pointing device such as a mouse. The location script of the chosen elements is displayed in frame 67 of FIG. 7. Examples of location scripts include: the first paragraph on the page that contains a specific word, cell #8 in table 3, words 25 to 50, or the first table that contains the word "weather". In each case, when one or more extractable elements are highlighted by the user, the appropriate options pop-up on the screen. Thus if a variable in a cell is highlighted, the choices given may include this specific cell, or the cell labeled with the current label.

In block 106, a template is built indicating the precise location of the extractable element as defined both the by the current URL, which was tracked in block 100, and the location script. In addition, a space is provided for descriptive titles or labels which will define for the customer what information is to be retrieved. The service definition title is also inserted, so that the customer may choose the service from the list of service titles in the services database 30. The location script contains information describing the data, so that if the format of the page is changed, the location script can usually still find the requested information. For example, if the data is an element in a table, the column and row number is maintained.

An example of a template, on a web page that has the current weather for a number of locations is: "The current weather condition is (type=table table=3 cell=4) is: (type-table table-3 cell-5) celsius". The descriptive information is displayed with the retrieved information, with the first value (the location) being retrieved from the third table, fourth cell on the page, and the second value (the temperature) being retrieved from the third table and the fifth cell on the page. The full output template containing descriptive titles, and location script is displayed in frame 67 of FIG. 7, which is another layer of frame 61. In block 108, the information is stored in the services database 30.

Figure 8:
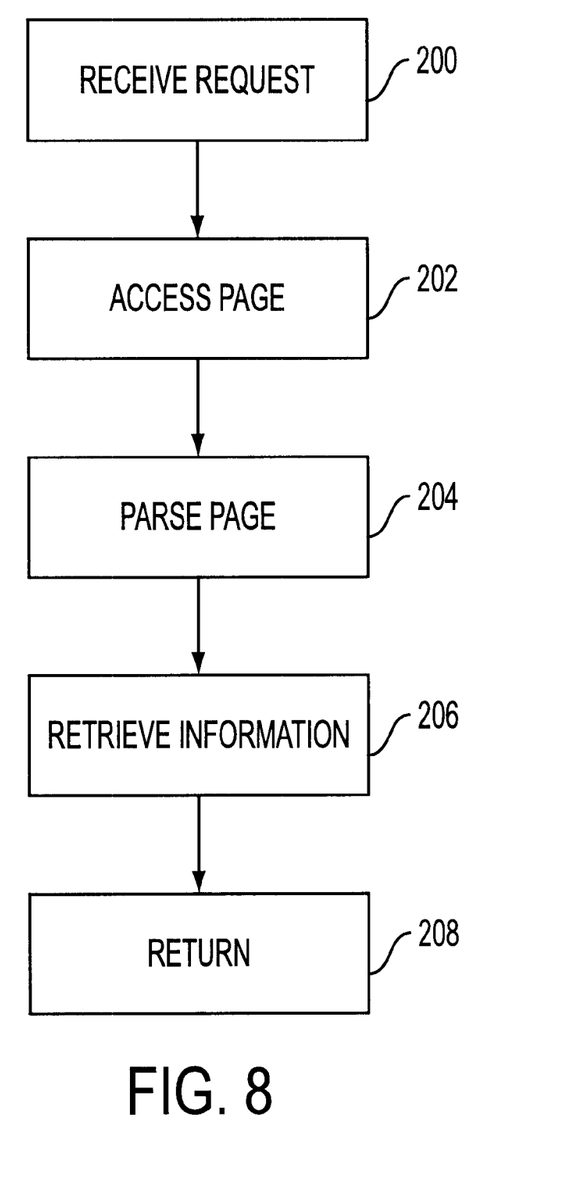
FIG. 8 illustrates a high level flow chart of the functional operation of the software tool for extracting information.

Referring now to FIG. 8, there is shown a high level flow chart of the function of the peeler server 32. The program begins in block 200, with the URL and the location script being received as the starting input from the SRE 28. In block 202, the peeler server accesses the Internet Page as defined by the URL, and in block 204, it parses the page using PERL or another language. In block 206 it finds the requested data in the parsed page by using the location script provided, and in block 208 it returns the desired information.

As described previously, the retrieved information is then returned to the SRE 28, which passes it to the delivery mechanism 16 such as short message service center (SMSC) 42 for delivery to the customer.

While the invention has been described in detail for information retrieval from a web page, this is not intended to be limiting in any way. A similar procedure would be followed for a page on an intranet which would be retrieved over a Local Area Network (LAN) or a Wide Area Network (WAN) in place of Internet 14. The information source may also consist of an ODBC compatible database which may easily be converted to HTML by those skilled in the art, for display and retrieval in the manner described above. Internal text files, non-compatible databases and proprietary external data sources may also be retrieved in a similar manner. Proprietary external data sources, such as information source 39, may be directly connected to peeler server 32, or to proxy server 34, or to proprietary data server 35 (via dotted line). If a standard browser is unable to display the information, a proprietary compatible browser or other display tool may be utilized. The SDT 26 will operate on this tool in a similar fashion, enabling the simple definition and subsequent retrieval of information.

In summary, the particular features which enable the system 10, to quickly and easily define new information services for delivery to a customer, are based on parsing a chosen information source and storing retrieval information in a services database. When access to the information is called for due to a scheduled event, the system accesses the information source and retrieves the desired information based on the retrieval information. The information may be delivered to information customers utilizing any protocol and delivery medium to any receiving unit. The information sources may be without limitation, an Internet web page, intranet page, database, text file, or other proprietary information source. Similarly, in a non-limiting fashion, the delivery may be to a cellular telephone display using any of a number of protocols and technologies, or to a fax machine, e-mail server, or voice mailbox. It may also be delivered to a customer's own configurable web page, with the information being displayed as per the customer's preference.

Having described the invention with regard to certain specific embodiments thereof, it is to be understood that the description is not meant as a limitation, since further modifications will become apparent to those skilled in the art, and it is intended to cover such modification as fall within the scope of the appended claims.

I claim:

1. A method of providing an information service to a user, comprising:

selecting a page of information for display to a user;

parsing the selected page of information into a plurality of extractable information elements;

attaching a locator to each extractable information element;

displaying the parsed page of information containing the locators to the user;

selecting, from the displayed parsed page of information, at least one of the extractable information elements for subsequent delivery to the user according to a predetermined scheduled time.

2. The method according to claim 1, further comprising displaying an output template to the user, said output template containing the locator(s) of the selected at least one extractable information element.

3. The method according to claim 2, wherein the parsed page of information and the output template are simultaneously displayed.

4. The method according to claim 2, further comprising selecting the page of information in accordance with the predetermined scheduled time, parsing the page of information selected in accordance with the predetermined scheduled time into the plurality of extractable information elements; and extracting from the parsed page of information, the selected at least one extractable information element in accordance with the locator(s) defined in the output template; and providing the extracted at least one extractable information element to the user.

5. The method according to claim 4, wherein the extracted at least one extractable element is provided to the user via at least one of: Short Messaging Service (SMS), facsimile and e-mail.

6. The method according to claim 1, wherein the predetermined scheduled time is determined by the user.

7. The method according to claim 1, wherein each locator is defined by inserting Javascript activation before or after each extractable information element.

8. The method according to claim 2, wherein the output template is stored and then retrieved prior to selecting the page of information in accordance with the predetermined scheduled time.

9. The method according to claim 1, wherein the page of information is a Web page.

10. The method according to claim 9, wherein the Web page is an Internet Web page selected by the user while browsing the Internet.

11. A method of providing an information service to a user, comprising:

selecting a Web page by a user;

displaying the selected Web page to the user;

parsing the selected Web page into a plurality of extractable information elements;

attaching a locator to each extractable information element;

displaying the parsed Web page containing the locators to the user;

selecting, from the displayed parsed page, at least one of the extractable information elements;

displaying an output template containing the locator(s) of the selected at least one extractable information element to the user;

automatically selecting said Web page according to a predetermined scheduled time determined by the user;

parsing the Web page selected according to the predetermined scheduled time into the plurality of extractable information elements;

extracting from the parsed Web page the selected at least one extractable information element in accordance with the locator(s) defined in the output template;

providing the extracted at least one extractable information element to the user.

12. The method according to claim 11, wherein the Web page is an Internet Web page, and the user selects the Internet Web page while browsing the Internet.

13. The method according to claim 11, wherein the Web page is an Intranet Web page.

14. The method according to claim 11, wherein the extracted at least one extractable information element is provided for delivery to the user via at least one of: a short message service center (SMSC), an e-mail and a facsimile.

15. A server for providing an information service to a user, comprising:

a selecting module for selecting a page of information for display to a user;

a parsing module for parsing the selected page of information into a plurality of extractable information elements;

a module for attaching a locator to each extractable information element;

a module for displaying the parsed page of information containing the locators to the user;

a module for selecting, from the displayed parsed page of information, at least one of the extractable information elements for subsequent delivery to the user according to a predetermined scheduled time.

16. The server according to claim 15, further comprising a module for displaying an output template to the user, said output template containing the locator(s) of the selected at least one extractable information element.

17. The server according to claim 15, wherein the parsed page of information and the output template are simultaneously displayed to the user.

18. The server according to claim 15, further comprising a module for parsing the page of information selected in accordance with the predetermined scheduled time into the plurality of extractable information elements; and extracting from the parsed page of information, the selected at least one extractable information element in accordance with the locator(s) defined in the output template; and providing the extracted at least one extractable information element to the user.

19. The server according to claim 18, wherein the extracted at least one extractable element is provided to the user via at least one of a a Short Messaging Service Center (SMS), a facsimile server and e-mail server.

20. The server according to claim 15, further comprising a user tool for allowing the user to determine the predetermined scheduled time.

21. The server according to claim 15, further comprising a service definition tool for defining each locator by inserting Javascript activation before or after each extractable information element.

22. The server according to claim 16, further comprising a database for storing the output template, and wherein the output template is retrieved prior to selecting the page of information in accordance with the predetermined scheduled time.

23. The server according to claim 15, wherein the page of information is a Web page.

24. The server according to claim 23, further comprising a Browser, and wherein the Web page is an Internet Web page selected by the user while browsing the Internet with said Browser.

* * * * *